(No Model.)  3 Sheets—Sheet 1.
A. K. MANSFIELD.
VALVE GEAR FOR STEAM ENGINES.
No. 510,279. Patented Dec. 5, 1893.
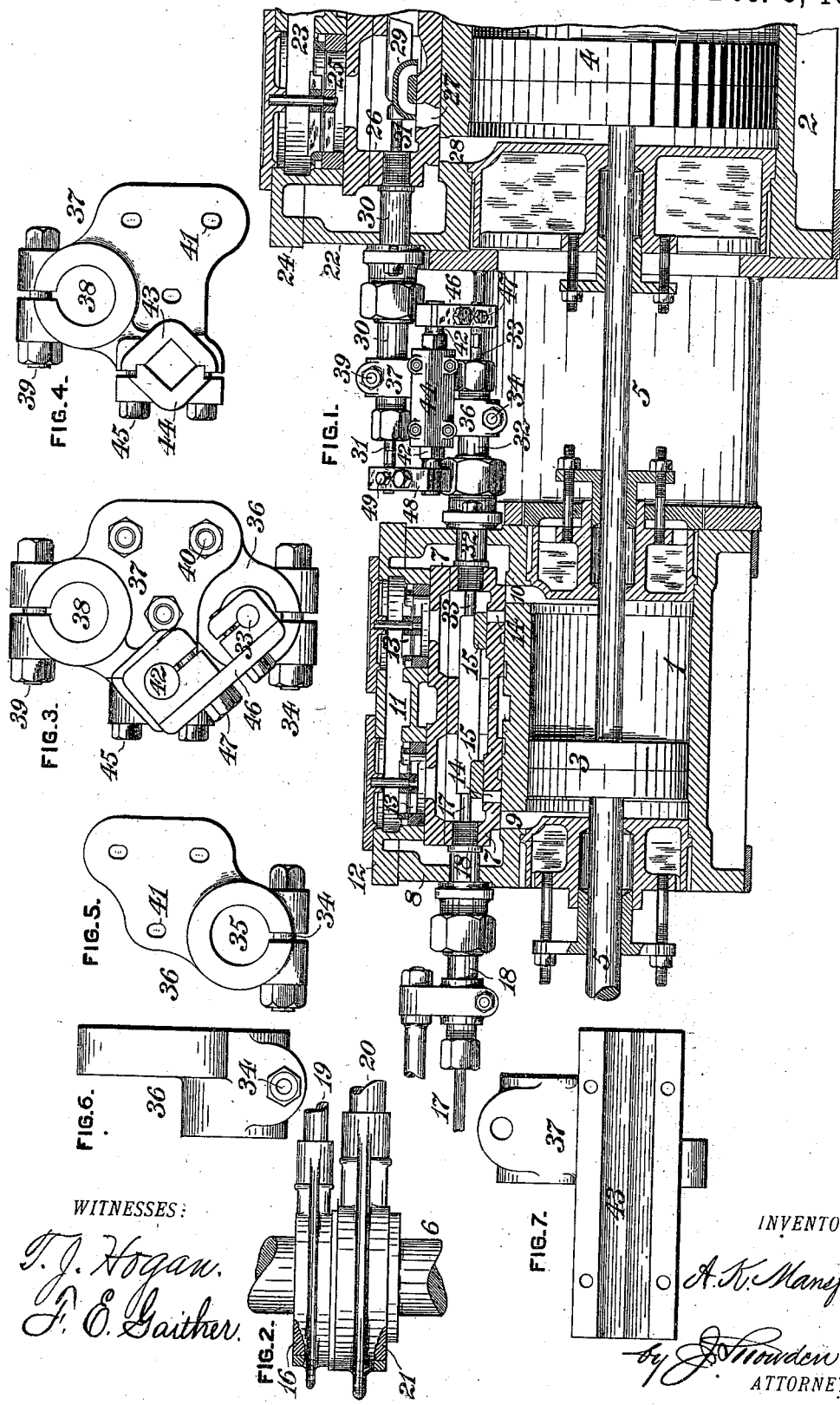
WITNESSES:
T. J. Hogan.
F. E. Gaither.
INVENTOR
A. K. Mansfield,
by J. Snowden Bell
ATTORNEY (No Model.)  
3 Sheets—Sheet 2.

A. K. MANSFIELD.
VALVE GEAR FOR STEAM ENGINES.

No. 510,279. Patented Dec. 5, 1893.

WITNESSES:  
T. J. Hogan.  
J. E. Gaither.

INVENTOR,  
A. K. Mansfield,  
by J. Snowden Bell,  
Att'y.

(No Model.) 3 Sheets—Sheet 3.
A. K. MANSFIELD.
VALVE GEAR FOR STEAM ENGINES.
No. 510,279. Patented Dec. 5, 1893.
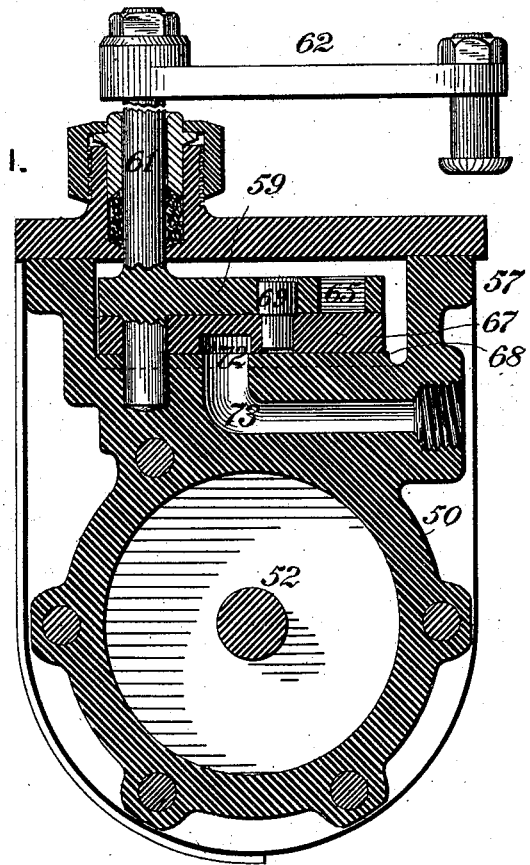
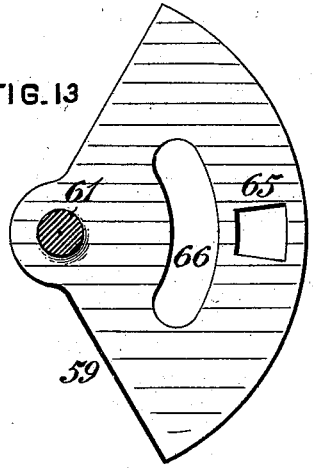
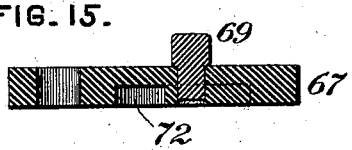
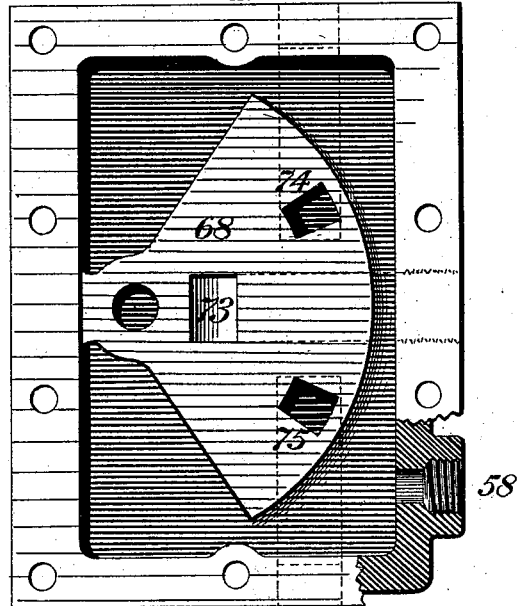
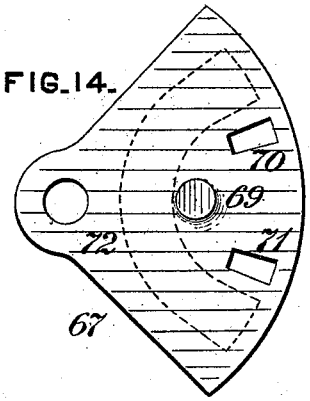
WITNESSES:
T. J. Hogan.
F. E. Gaither
INVENTOR,
A. K. Mansfield,
by Snowden Bell,
Att'y.

UNITED STATES PATENT OFFICE.

ALBERT K. MANSFIELD, OF SALEM, OHIO.

VALVE-GEAR FOR STEAM-ENGINES.

SPECIFICATION forming part of Letters Patent No. 510,279, dated December 5, 1893.

Application filed August 10, 1893. Serial No. 482,813. (No model.)

*To all whom it may concern:*

Be it known that I, ALBERT K. MANSFIELD, of Salem, in the county of Columbiana and State of Ohio, have invented a certain new and useful Improvement in Valve-Gear for Steam-Engines, of which improvement the following is a specification.

My invention, while more particularly designed for application in compound engines of the tandem type, is also desirably applicable in simple engines having comparatively heavy valves, and its object is to provide a construction whereby the cut off valves of a high pressure and a low pressure cylinder may be coincidently operated by a single eccentric with the least practicable amount of wear and number of surfaces requiring lubrication; and also to overcome the resistance due to the inertia of heavy valves and facilitate their operation by reducing the frictional resistance to their motion which opposes the action of the eccentrics by which they are operated.

To this end, my invention, generally stated, consists in the combination, with the main valve stems of a tandem compound engine, of a connection composed of two sections, each clamped to one of the valve stems, and abutting in a plane perpendicular to the axes thereof, and connecting bolts securing said sections one to the other; also, in the combination of the main valve stems of a tandem compound engine, a two section clamp connection between said valve stems, a bearing fixed to one of the sections of the clamp connection, and a cut off valve stem connection fitted to reciprocate in said clamp connection; also, in the combination with a steam engine distribution valve and an actuating eccentric, of an auxiliary fluid pressure cylinder, a piston working therein and connected to the distribution valve, and a distribution valve controlling the supply and exhaust of the auxiliary cylinder, and actuated from and by a member of the main engine valve mechanism.

The improvement claimed is hereinafter fully set forth.

Figure 8:
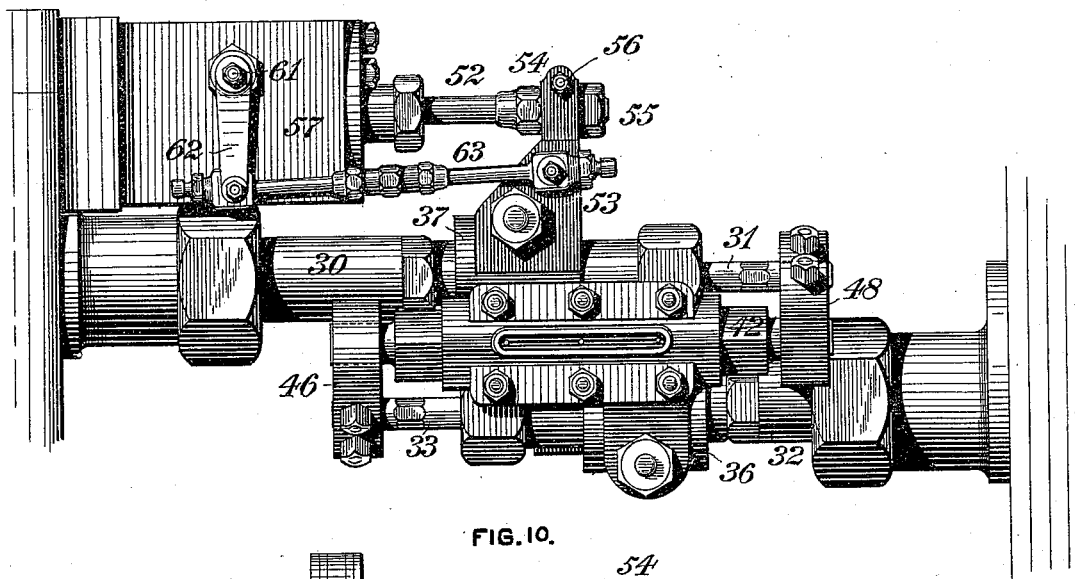
Figure 10:
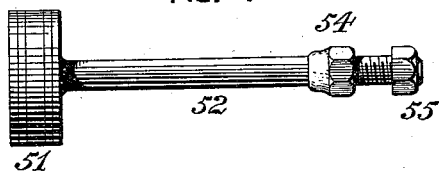
Figure 9:
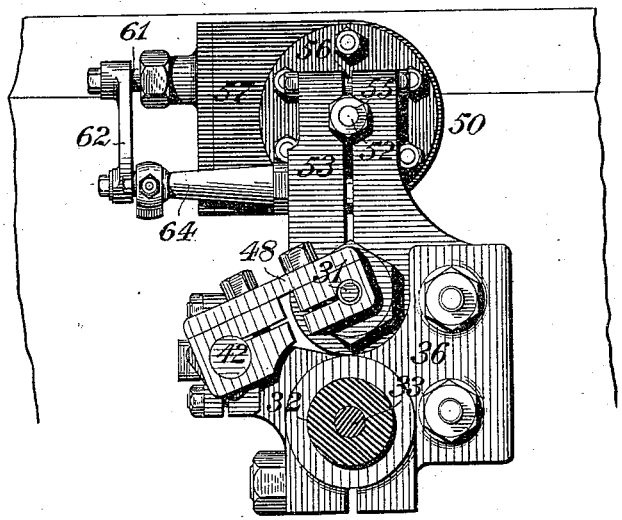

In the accompanying drawings: Figure 1 is a longitudinal central section through the cylinders and valve chests of a tandem compound engine, illustrating an application of my invention; Fig. 2, a view, partly in elevation and partly in section, showing the operating eccentrics with their straps and rods; Fig. 3, an end view, in elevation, and on an enlarged scale, of the valve stem clamp connection; Fig. 4, a similar view of the low pressure valve stem section of the connection; Fig. 5, a similar view of the high pressure valve stem section of the connection; Fig. 6, a side view of the high pressure section; Fig. 7, a similar view of the low pressure section, with the cap of the bearing removed; Fig. 8, a plan view, in elevation, illustrating the application of the auxiliary fluid pressure cylinder and clamp connection; Fig. 9, an end view of the same; Fig. 10, a view in elevation, of the piston and rod of the auxiliary cylinder; Fig. 11, a transverse section through the auxiliary cylinder and its valve chest; Fig. 12, a plan view of the valve face and ports of the auxiliary cylinder; Fig. 13, a face view of the auxiliary distribution valve; Fig. 14, a similar view of the movable port plate of the auxiliary distribution valve; and Fig. 15, a central section through the same.

My invention is herein illustrated as applied in connection with a tandem compound engine, of the "Buckeye" type, in which, as is well known to those skilled in the art, the main distribution valve is hollow, or of box form, and reciprocates in a chest which is open to the exhaust pipe, steam being admitted to the interior of the main valve, through hollow balance pistons fitting against its back, and being thence admitted to the cylinder through ports in the main valve controlled by a cut off valve. The main valve is actuated by a fixed eccentric, and the cut off valve by an adjustable eccentric, controlled by an automatic cut off governor, the cut off valve stem passing through and working freely in the tubular stem by which the main valve is actuated.

My present invention is specially applicable to tandem compound engines, having each of their cylinders provided with a main and cut off valve of the character above specified, and, in such application, enables the two main valves to be operated coincidently, and the two cut off valves to be also operated coincidently and independently of the main valves, and to be controlled by a single governor, with the use, on both cylinders, of the same system of tubular main valve stems and cut off valve stems working therein, as has heretofore been employed on simple engines.

As herein exemplified, my invention is applied to a compound engine, having a high pressure cylinder 1 and a low pressure cylinder 2, which are set in the same axial line and provided, respectively, with pistons 3, 4, secured upon a common piston rod 5, which is coupled by the ordinary connections, not shown in the drawings, to a crank pin upon a main or crank shaft 6. The supply and exhaust of steam to and from the high pressure cylinder 1 are effected by a main distribution valve 7, which is of hollow or box form and is fitted to be reciprocated in a valve chest 8, and to govern induction and eduction ports 9, 10, leading therefrom to the cylinder 1. The valve chest 8 communicates with an exhaust pipe leading to a chamber in the cover of the valve chest of the low pressure cylinder, and steam is admitted to the interior of the high pressure main valve 7 from a chamber 11 in the cover 12 of the valve chest 8, communicating with the main steam supply pipe from the boiler, through hollow balance pistons 13, fitting against the back of the main valve 7. The admission of steam from the main valve to the cylinder ports 9, 10, is effected through ports 14 in the main valve, which ports are controlled by a cut off valve 15, formed of two connected plates, and actuated by a loose eccentric 16 on the crank shaft, said eccentric being varied and controlled in position by an automatic cut off governor. The valve 17, of the cut off valve, passes freely through a tubular valve stem 18, fixed to the main valve, and is coupled by suitable intermediate connections, to the rod 19, of the cut off eccentric 16. The valve stem 18, of the main valve, is connected to the rod 20, of an eccentric 21 fixed on the crank shaft.

The low pressure cylinder 2 is provided with similar main and cut off valves, working in planes parallel with those of the high pressure valves, in a valve chest 22, which communicates with an exhaust pipe leading to the atmosphere or to a condenser. The exhaust steam from the high pressure cylinder is supplied to a chamber 23, in the cover 24, of the valve chest 22, and thence passes, through balance pistons 25, into the interior of the hollow main valve 26, which is provided with ports 27, adapted to communicate with cylinder induction and eduction ports 28, and controlled by a cut off valve 29. The main valve is actuated by a tubular stem 30, and the cut off valve by a stem 31, passing freely through the main valve stem 30.

In the practice of my invention, I provide for the simultaneous actuation of the main valves of the high and low pressure cylinders by one eccentric, and the simultaneous and independent actuation of the cut off valves of the high and low pressure cylinders by another eccentric, which is controlled by a governor, by the following construction: A tubular valve stem 32 is secured to the rear end of the high pressure main valve 7, or that nearest the low pressure cylinder, in line axially with the stem 18 by which the main valve is actuated, and a valve stem 33, is secured to the same end of the high pressure cut off valve 15, and passes freely through the valve stem 32. The rear main valve stem 32 is secured by a clamping bolt 34, in a socket 35, formed on one part or section 36, of a two section clamp connection 36, 37, the sections of which abut, by finished faces, in a plane perpendicular to the axes of the valve stems of the high and low pressure cylinders. The other section 37 of the clamp connection is provided with a socket 38, in which the tubular stem 30, of the low pressure main valve 26, is secured by a clamping bolt 39. The sections 37 and 38 are secured one to the other by bolts 40, passing through holes 41, which are slotted or elongated in a plane parallel with the axes of the valve stems, and are provided with nuts bearing against an outer end face of one of the sections.

A bearing 43, which is preferably, as shown, of V or half square section, and is provided with a cap 44, held in position by adjusting bolts 45, is formed upon one of the sections of the clamp connection 36, 37, in this instance the section 37 through which the low pressure main valve stem 30 passes. The bearing 43 receives and serves as a guide for, a shaft 42, the middle portion of which is squared, in conformity with the bearing 43 and cap 44. The rear end of the shaft 42 is connected by a cut off clamp 46 and clamping bolts 47, to the rear end of the rear stem 33, of the high pressure cut off valve 15, and the front end of the shaft 42 is connected by a similar cut off clamp 48 and clamping bolts 49 to the front end of the stem 31 of the low pressure cut off valve 29.

It will be seen that as above described, the coincident operation of the high and low pressure main valves, and the independent coincident operation of the high and low pressure cut off valves, is provided for in a simple and effective manner, no additional wearing pivots being employed, and the bearing of the shaft 42 being the only part requiring lubrication. A special feature of advantage of the construction is, moreover, presented in the capability of adjustment in case a variation of the distance between the axes of the main valve stems is desired, this being provided for by the location of the abutting faces of the sections of the clamp connection perpendicularly to said axes, and the connection of the sections by bolts passing through elongated openings.

Figs. 8 to 14 inclusive, illustrate a clamp connection of the construction above described, to which is applied an auxiliary fluid pressure cylinder and piston, by which a portion of the work of actuating the main valves of the engine is performed, and the eccentric and intermediate connections are correspondingly relieved from the strains due to the inertia and frictional resistance of heavy valves. To this end, I provide an auxiliary fluid pressure cylinder 50, which is supported in any convenient position adjacent to the stem of the valve or valves which are to be operated, as, for example, on the front end of the low pressure valve chest, and is fitted with a properly packed piston 51, the rod 52 of which is secured to the stem of the main distribution valve or valves which are to be operated, being, in this instance, the main valves 7 and 26 of the high and low pressure cylinders 1 and 2 of Fig. 1. The connection of the piston rod and valve stems is most desirably effected through the clamp connection 36, 37, hereinbefore described, of the valve stems 32 and 30. For this purpose, one of the sections of said connections, (the section 37 being shown in the drawings as selected,) is provided with an arm or projection 53, to which the piston rod 52 is secured by nuts 54, 55, engaging a thread on the piston rod and bearing against opposite end faces on the projection 53, which may also be split, as shown in Fig. 9, so as to form jaws which are clamped together upon the piston rod by a bolt 56.

Steam or other motive fluid for the actuation of the piston 51 is supplied to a valve chest 57, formed on one side of the auxiliary cylinder 50, through a supply passage 58, communicating with a suitable supply pipe, and is admitted to and exhausted from the cylinder 50, by a distribution valve 59 and movable port plate 67. The distribution valve 59 is of sectoral form, and is fixed upon a shaft 61, which is journaled in bearings in the valve chest 57, and is rocked about its axial line by an arm 62, fixed upon its outer end, and coupled, by an adjustable connecting rod 63, to a pin 64, fixed to the projection 53 of the clamp connection section 37. A port 65 is formed in the distribution valve 59, adjacent to its periphery, between which port and the center of the shaft 61, a curved slot 66 extends part way across the valve, the inner and outer sides of the port and slot being concentric with the shaft 61. A movable port plate 67, which is also of sectoral form, is journaled on the shaft 61, between the distribution valve 59 and the valve face 68 of the chest 57, said port plate fitting truly, on its opposite sides, against the valve and valve face respectively, and having a pin 69, on its outer side, which engages the slot 66 of the valve 59. Ports 70, 71, adapted to register with the port 65, are formed in the port plate 67, adjacent to its periphery, and a passage 72, which is curved in reverse direction to the inner and outer sides of the port 65 and slot 66 of the auxiliary distribution valve 59, is formed on the face of the port plate 67 which bears on the valve face 68, the ends of said passage being curved to the same radius as the outer sides of the ports 65, 70, and 71. The passage 72, which corresponds with the exhaust recess of an ordinary slide valve, is continuously in register with an exhaust passage 73 in the valve face 68, and alternately registers with one or the other of the induction and eduction ports 74, 75, leading from the valve face to opposite ends of the cylinder.

It will be seen that the motion of the arm 62 and shaft 61, by which the distribution valve is actuated, is derived from that of the main valve or valves of the engine, and that the traverse of the arm is equal to and coincides, in time and direction, with, that of said valve or valves. The pin 69 of the port plate, and curved slot 66 of the valve, are preferably so arranged as to cause steam to be cut off in the auxiliary cylinder 50, at about one quarter stroke. Compression in the auxiliary cylinder is not provided for, inasmuch as it would resist, instead of assisting, the action of the eccentric by which the main distribution valves are operated. A rocking slide valve is employed instead of a reciprocating one, in order to reduce the space required for its movements.

In the operation of the valve mechanism above described, the movement of the valve 59, in either direction, admits steam through the valve port 65, and one or the other, as the case may be, of the ports 70 or 71 of the port plate, and 74 or 75 of the valve face, to one end of the cylinder 50, the opposite end of the cylinder being meanwhile open to the exhaust passage 73, through the opposite port (75 or 74) of the valve face, and the passage 72 of the port plate. In the further traverse of the valve, its port 65 passes beyond the adjacent port of the port plate, thereby cutting off steam from the cylinder. The pin 69 of the port plate is next engaged by the rear end (in relation to traverse) of the slot 66 of the valve, which thereupon carries with it the port plate for the remainder of its traverse, thereby closing the communication between the exhaust side of the piston and the exhaust pipe, and bringing the port plate into proper position for a corresponding action of the parts, upon the movement of the valve in the opposite direction.

While I have herein illustrated the auxiliary valve actuating mechanism as applied in connection with the main distribution valves of a compound engine, it will be obvious that its employment is in no wise limited to engines of that, or any other, specific type, nor to valves of any special form or construction. Its leading and essential feature consists in the provision of an auxiliary fluid pressure cylinder and piston, acting to supplement, and relieve strain upon, an eccentric operating the valve or valves of a main engine, the distribution functions of said auxiliary cylinder being derived from, and dependent wholly upon, the movements of the main engine valve mechanism. Such feature may be embodied with equal facility, and with correspondingly advantageous results, without variation of structural or operative principle, in engines having a single cylinder, or a pair of single expansion cylinders, whether provided with valves of the same construction as, or of different construction from, those herein shown and described.

I claim as my invention and desire to secure by Letters Patent—

1. The combination, in a steam engine, of two cylinders having valves working in different planes, stems connected to the valves, and a connection between the stems formed of two sections having abutting faces at right angles thereto and adjustably connected, whereby the movement of one valve is imparted to the other, with the capacity of adjustment parallel to their stems, substantially as set forth.

2. The combination of a high pressure distribution valve stem, a low pressure distribution valve stem, a connection between said valve stems, and a bearing in said connection for a cut off valve shaft or connection, substantially as set forth.

3. In a compound engine, the combination, with two main valves and their stems, of a high-pressure cut off valve stem, a low pressure cut off valve stem, a reciprocating shaft working in a bearing, and connections from the reciprocating shaft to each of the cut off valve stems whereby the motion of one valve stem is imparted to the other valve stem, substantially as set forth.

4. The combination, in a steam engine, of two reciprocating valve stems having lateral or transverse connections to an intermediate reciprocating shaft, plane surfaces formed on a portion of said intermediate shaft and fitting similar surfaces on a bearing in which said shaft is carried, and a rigid connection between said bearing and a valve stem which is movable independently of the valve stems connected to the intermediate shaft, substantially as set forth.

5. The combination, in a steam engine, of two reciprocating valve stems having lateral or transverse connections to an intermediate reciprocating shaft working in a bearing, the bearing and the portion of the shaft working therein being rectangular in cross section, and having plane surfaces at right angles to the line of thrust or pull exerted through the connections between the valve stems and the reciprocating shaft, and a rigid connection between said bearing and a valve stem which is movable independently of the valve stems connected to the reciprocating shaft, substantially as set forth.

6. In a steam engine, the combination of two main valve stems, a connection between said stems, a rectangular bearing in said connection, and a rectangular shaft working in said bearing and having connections to two cut-off valve stems, substantially as set forth.

7. The combination, in a compound engine having main distribution and cut off valves, of a high pressure cut off valve stem, a low pressure cut off valve stem, an intermediate reciprocating shaft, and adjustable connections between the reciprocating shaft and the cut off valve stems, substantially as set forth.

8. The combination of a high pressure distribution valve stem, a low pressure distribution valve stem, a clamp connection formed in two sections abutting in a plane perpendicular to the axes of the valve stems, and each fixed to one of said valve stems, and connecting bolts securing said sections one to the other, substantially as set forth.

9. The combination of a high pressure distribution valve stem, a low pressure distribution valve stem, a clamp connection formed in two sections abutting in a plane perpendicular to the axes of the valve stems, and each fixed to one of said valve stems, and connecting bolts passing through enlarged openings in the sections and securing said sections one to the other with the capacity of adjustment in planes parallel to the axes of the valve stems, substantially as set forth.

10. The combination of a high pressure distribution valve stem, a low pressure distribution valve stem, a clamp connection formed in two sections abutting in a plane perpendicular to the axes of the valve stems, and each fixed to one of said valve stems, a bearing for a cut off valve shaft fixed to one of the sections, and connecting bolts securing said sections one to the other, substantially as set forth.

11. The combination of a high pressure main valve stem, a low pressure main valve stem, a clamp connection formed in two sections abutting in a plane perpendicular to the axes of the valve stems, and each fixed to one of said valve stems, a bearing for a cut off valve shaft fixed to one of the sections, a high pressure cut off valve stem, a low pressure cut off valve stem, a cut off valve shaft fitted to slide in the bearing of the clamp connection, and clamps securing the opposite ends of the cut off valve shaft to the high pressure and to the low pressure cut off valve stems respectively, substantially as set forth.

12. The combination of a steam engine distribution valve, an ordinary valve mechanism for actuating said valve, and an auxiliary fluid pressure valve mechanism connected to said valve and assisting in the actuation thereof by the application of power thereto coincidently with, and in the same direction as, the ordinary valve mechanism, substantially as set forth.

13. The combination of a steam engine distribution valve, a valve mechanism for actuating said valve, and an auxiliary fluid pressure valve actuating mechanism, connected to said valve and controlled by the valve mechanism of the main engine, so as to effect the application of power to the distribution valve coincidently with, and in the same direction as, the valve mechanism of the same engine, substantially as set forth.

14. The combination of a steam engine distribution valve, an independent fluid pressure valve actuating mechanism, and a cut off device for working motive fluid expansively in said fluid pressure valve mechanism, substantially as set forth.

15. The combination of a steam engine distribution valve, a valve mechanism for actuating said valve, an auxiliary fluid pressure valve mechanism for assisting in the actuation of said valve, and an independent cut off device for working motive fluid expansively in said auxiliary fluid pressure valve mechanism, substantially as set forth.

16. The combination of a steam engine distribution valve, an actuating eccentric coupled thereto, an auxiliary fluid pressure cylinder, a piston working in said cylinder and connected to the distribution valve mechanism of the main engine, and a distribution valve controlling the supply and exhaust of the auxiliary cylinder and actuated from and by a member of the main engine valve mechanism, substantially as set forth.

17. The combination of a steam engine distribution valve, an actuating eccentric coupled thereto, an auxiliary fluid pressure cylinder, a piston working in said cylinder, connections coupling said piston to the distribution valve mechanism of the main engine, a distribution valve controlling the supply and exhaust of the auxiliary cylinder, and connections coupling said distribution valve to the distribution valve mechanism of the main engine, substantially as set forth.

18. The combination of a high pressure distribution valve stem, a low pressure distribution valve stem, a clamp connection securing said valve stems one to the other, an actuating eccentric coupled to one of said valve stems, an auxiliary fluid pressure cylinder, a piston working therein and coupled to the clamp connection, a distribution valve controlling the supply and exhaust of the auxiliary cylinder, and connections coupling said distribution valve to the clamp connection, substantially as set forth.

19. The combination of a steam engine distribution valve, an actuating eccentric coupled thereto, an auxiliary fluid pressure cylinder, a piston working in said cylinder and connected to the distribution valve of the main engine, a distribution valve having a port adapted to register with induction and eduction ports leading to opposite ends of the auxiliary cylinder, a movable port plate having two ports each adapted to register with one of the induction and eduction ports of the auxiliary cylinder and with the port of the auxiliary distribution valve, and having an exhaust recess adapted to register with the induction and eduction ports and the exhaust port of the auxiliary cylinder, a connection for actuating said port plate by the movements of the auxiliary distribution valve, and connections coupling the auxiliary distribution valve to a member of the valve mechanism of the main engine, substantially as set forth.

20. The combination, in a steam engine valve gear, of a distribution valve and a movable port plate actuated by said valve, the valve and port plate being subject to steam pressure on their outer sides, and the port plate having an exhaust recess on its inner side, whereby unbalanced pressure is exerted on the port plate to prevent motion thereof except when acted on positively by the distribution valve, substantially as set forth.

ALBERT K. MANSFIELD.

Witnesses:
EDGE T. COPE,
HARRY D. BROWN.